United States Patent
Wright et al.

(10) Patent No.: US 6,869,153 B2
(45) Date of Patent: Mar. 22, 2005

(54) TRACK AND TRACK ASSEMBLY FOR A TRACK LAYING VEHICLE

(75) Inventors: Earl Fleming Wright, Farragut, TN (US); Andrew Edward Modzik, Jr., Knoxville, TN (US); Donald Rodney Flatau, Oak Ridge, TN (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 10/119,233

(22) Filed: Apr. 9, 2002

(65) Prior Publication Data

US 2003/0189377 A1 Oct. 9, 2003

(51) Int. Cl.$^7$ .............................................. B62D 55/24
(52) U.S. Cl. ....................... 305/169; 305/165; 305/178
(58) Field of Search ................................ 305/160, 165, 305/169, 173, 174, 178, 179, 180, 195, 171, 177, 168, 130, 136, 137, 142, 199

(56) References Cited

U.S. PATENT DOCUMENTS

| | | | | |
|---|---|---|---|---|
| 2,461,849 A | * | 2/1949 | Slemmons et al. | 305/171 |
| 3,472,563 A | | 10/1969 | Irgens | 305/13 |
| 3,948,110 A | * | 4/1976 | Lassanske | 305/178 |
| 4,082,371 A | | 4/1978 | Werner et al. | |
| 4,383,794 A | * | 5/1983 | Sankey | 414/694 |
| 4,452,495 A | | 6/1984 | Orlandea | |
| 4,474,414 A | * | 10/1984 | Tokue | 305/168 |
| 4,546,842 A | * | 10/1985 | Yasui | 305/165 X |
| 4,678,244 A | | 7/1987 | Furuta et al. | 305/57 |
| 4,714,302 A | | 12/1987 | Svensson et al. | 305/165 |
| 4,961,395 A | * | 10/1990 | Coast | 440/12.64 |
| 5,131,731 A | * | 7/1992 | Johnson | 305/195 |
| 5,316,381 A | | 5/1994 | Isaacson et al. | |
| 5,393,134 A | * | 2/1995 | Oertley | 305/199 |
| 5,484,321 A | * | 1/1996 | Ishimoto | 305/165 X |
| 5,511,870 A | | 4/1996 | Mai | |
| 5,540,489 A | | 7/1996 | Muramatsu et al. | |
| 5,593,218 A | * | 1/1997 | Katoh et al. | 305/174 |
| 5,636,911 A | * | 6/1997 | Korpi | 305/197 |
| 5,842,757 A | | 12/1998 | Kelderman | |
| 5,984,438 A | | 11/1999 | Tsunoda et al. | |
| 6,000,766 A | | 12/1999 | Takeuchi et al. | 305/160 |
| 6,065,818 A | | 5/2000 | Fischer | |
| 6,129,426 A | * | 10/2000 | Tucker | 305/136 |
| 6,193,335 B1 | | 2/2001 | Edwards | |
| 6,247,547 B1 | | 6/2001 | Lemke et al. | |
| 6,296,329 B1 | | 10/2001 | Rodgers et al. | |
| 6,364,437 B1 | | 4/2002 | Phely | 305/116 |

FOREIGN PATENT DOCUMENTS

| | | | |
|---|---|---|---|
| DE | 2856204 A1 | | 7/1979 |
| GB | 2 229 410 A | | 9/1990 |
| JP | 55-79765 | * | 9/1980 |
| JP | 59-32576 | * | 2/1984 |
| JP | 59-106378 | * | 6/1984 |
| JP | 63-270293 | * | 11/1988 |
| JP | 4-342680 | * | 11/1992 |
| JP | 5-162667 | * | 6/1993 |
| JP | 6-48334 | * | 2/1994 |
| JP | 6-32262 | * | 8/1994 |
| JP | 08192777 A | | 7/1996 |

* cited by examiner

*Primary Examiner*—Russell D. Stormer

(57) ABSTRACT

A track assembly for moving a vehicle which includes a track having lugs including both drive and guide portions on its inner surface. The guide portions substantially abut against the track rollers of the assembly. Such abutment maintains alignment of the track between those rollers so as to prevent it from moving from side to side and interfering with feeding of the drive portions onto the assembly drive sprocket. Further, the guide portions grab against the drive sprocket to maintain contact of the drive portions therewith. Each of the above functions permits uninterrupted movement of the vehicle since the track is enabled to move in a continued path.

12 Claims, 9 Drawing Sheets

TRACK AND TRACK ASSEMBLY FOR A TRACK LAYING VEHICLE

FIELD OF THE INVENTION

This invention relates generally to a track and track assembly for a track laying vehicle, and more specifically, to a track assembly including a track having lugs which resist movement of the track from the vehicle drive sprocket and from the track rollers associated with the track.

BACKGROUND OF THE INVENTION

The tracks of track laying vehicles are often made of an elastomeric material and have similarly constructed raised projections or lugs on an inner surface. In positive drive tracked vehicles, these lugs fit into grooves created between the teeth of a drive wheel or drive sprocket which, together with a series of track rollers and an idler, define a path along which the track moves. As the track moves along this path, the lugs serve at least two purposes. First, they provide surfaces on the track which a drive sprocket can grab to move the track and thus, the vehicle. Second, the lugs maintain alignment of the track with the sprocket, idler and track rollers.

Typically, the lugs mentioned above are of the same size and shape. Particularly, the lugs are many times straight or flat-faced on their side surfaces so as to not include nubs or any other formation which can help to lock them into the sprocket grooves. The height of the lugs are generally limited because of potential interference between the lugs and the teeth of the drive sprocket as the lugs enter and leave the sprocket. Because there is no locking mechanism and the height of the lugs are limited, the belt can become misaligned. For instance, when the vehicle is turned the belt is forced to slide on the ground and the resistance to this sliding causes substantial belt misalignment forces to be produced which may force the track rollers to climb over the lugs. Also, when the vehicle is on a hillside, the weight of the vehicle tends to shift the vehicle downhill. But this movement is resisted by engagement of the track with the ground, again generating misalignment forces which may cause the rollers to climb over the adjacent lugs. As the rollers climb over the lugs, the track is detracked and the driving engagement between the lugs and drive sprocket is lost. Thus, it would be beneficial to provide a track with lugs configured to retain their engagement with the sprocket and their alignment between the rollers in order to maintain continuous movement of the vehicle.

SUMMARY OF THE INVENTION

According to the present invention, there is provided a track assembly including a belt or track having lugs which retain their engagement with the sprocket and which maintain alignment of the track with the rollers, idler and the sprocket, even when subjected to substantial misalignment forces.

The lugs mentioned above are provided in two parallel, spaced rows. Each individual lug includes an inboard drive portion which engages the teeth of the sprocket and an outboard guide portion which braces against the side of the drive sprocket. The guide portion of each individual lug is taller than and is joined to its associated drive portion to form a substantially L-shaped lug.

Because the guide portion of the lug does not engage with the teeth of the sprocket, the drive portion moves freely into and out of engagement with a tooth on the sprocket. Thus it can have a fairly substantial height and provide a good guiding surface that will maintain track alignment when the track is operating on an incline and/or the vehicle is being turned.

The above and additional features and advantages of the present invention will become apparent from a reading of the following detailed description of the invention when taken in conjunction with the accompanying drawings.

DESCRIPTION OF THE PREFERRED EMBODIMENT

Figure 1:
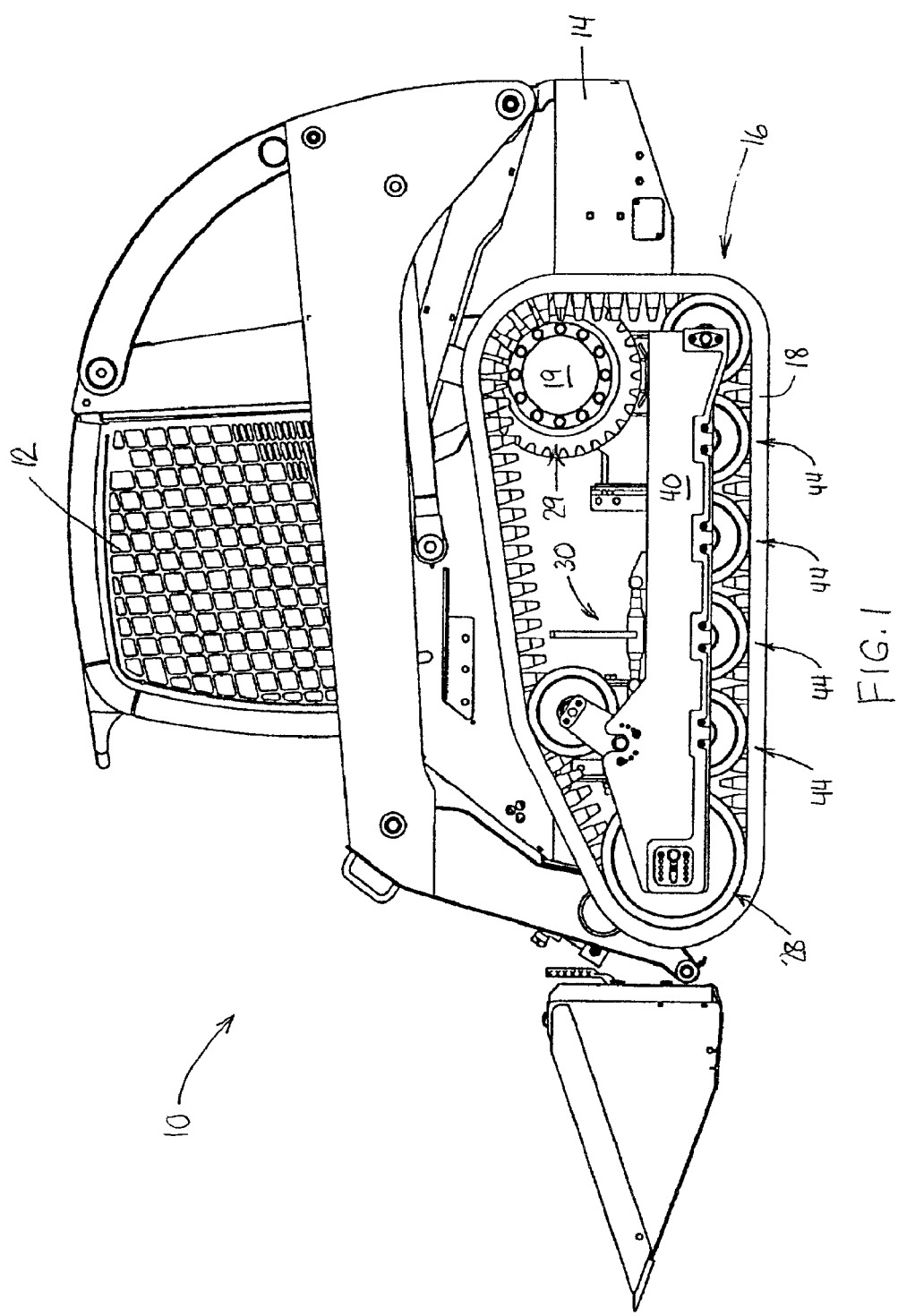
FIG. 1 is a side view of a vehicle in the form of a skid steer loader having a track and track assembly constructed according to the present invention.

Looking first to FIG. 1, there is shown a vehicle in the form of a skid-steer loader 10. At its mid-section, the vehicle includes an operator's station 12 supported upon the vehicle frame 14. The frame is supported by a track assembly or undercarriage 16 on each side. Each track assembly includes a ground engaging track 18 powered by a hydraulic motor 19.

Figure 2:
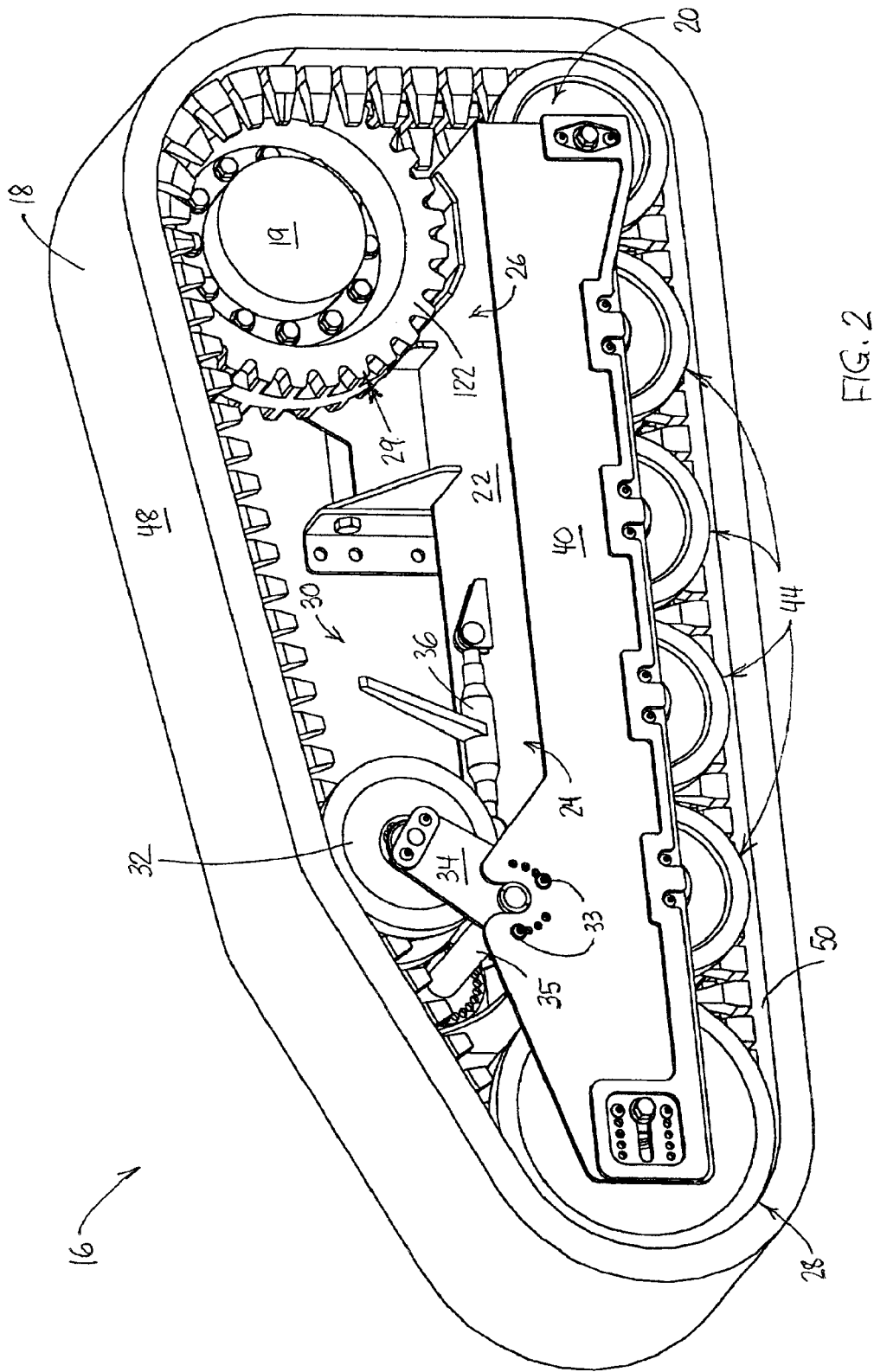
FIG. 2 is a side perspective view of the track assembly shown removed from the vehicle.

Looking next to FIG. 2, a track assembly 16 is shown in more detail. The assembly 16 includes a frame subassembly 20 having a top, center plate 22 and side plates 40. An idler wheel 28 is held at a first or front end 24 of the subassembly. A drive sprocket 29 is provided at the rear or second end 26 of the subassembly for transferring power from the motor 19 to the track 18. A tensioning device 30 is supported on the top plate 22 between the idler 28 and sprocket 29.

Figure 4:
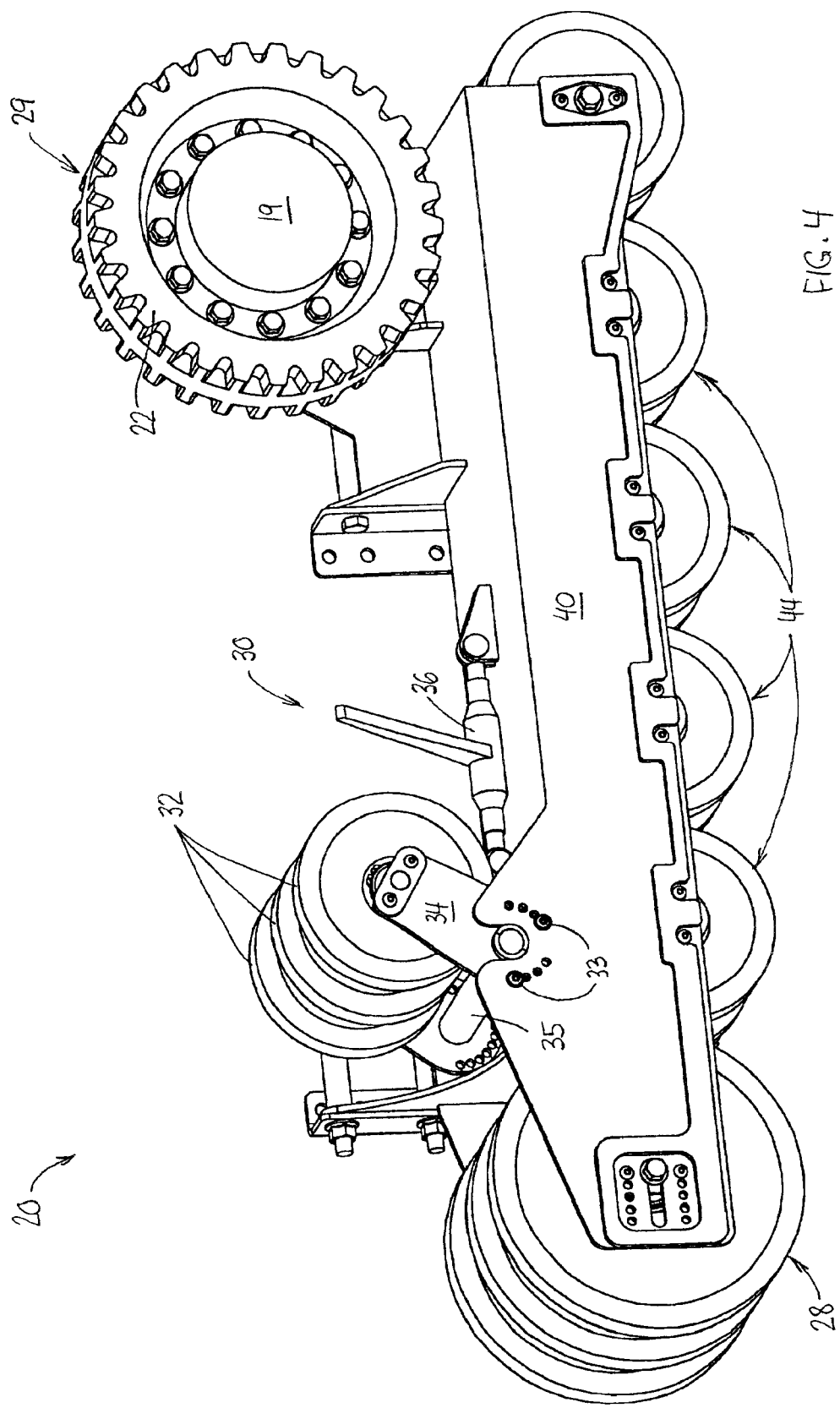
FIG. 4 is a side perspective view of the left frame subassembly on which the track shown in FIG. 3 is supported.
Figure 5:
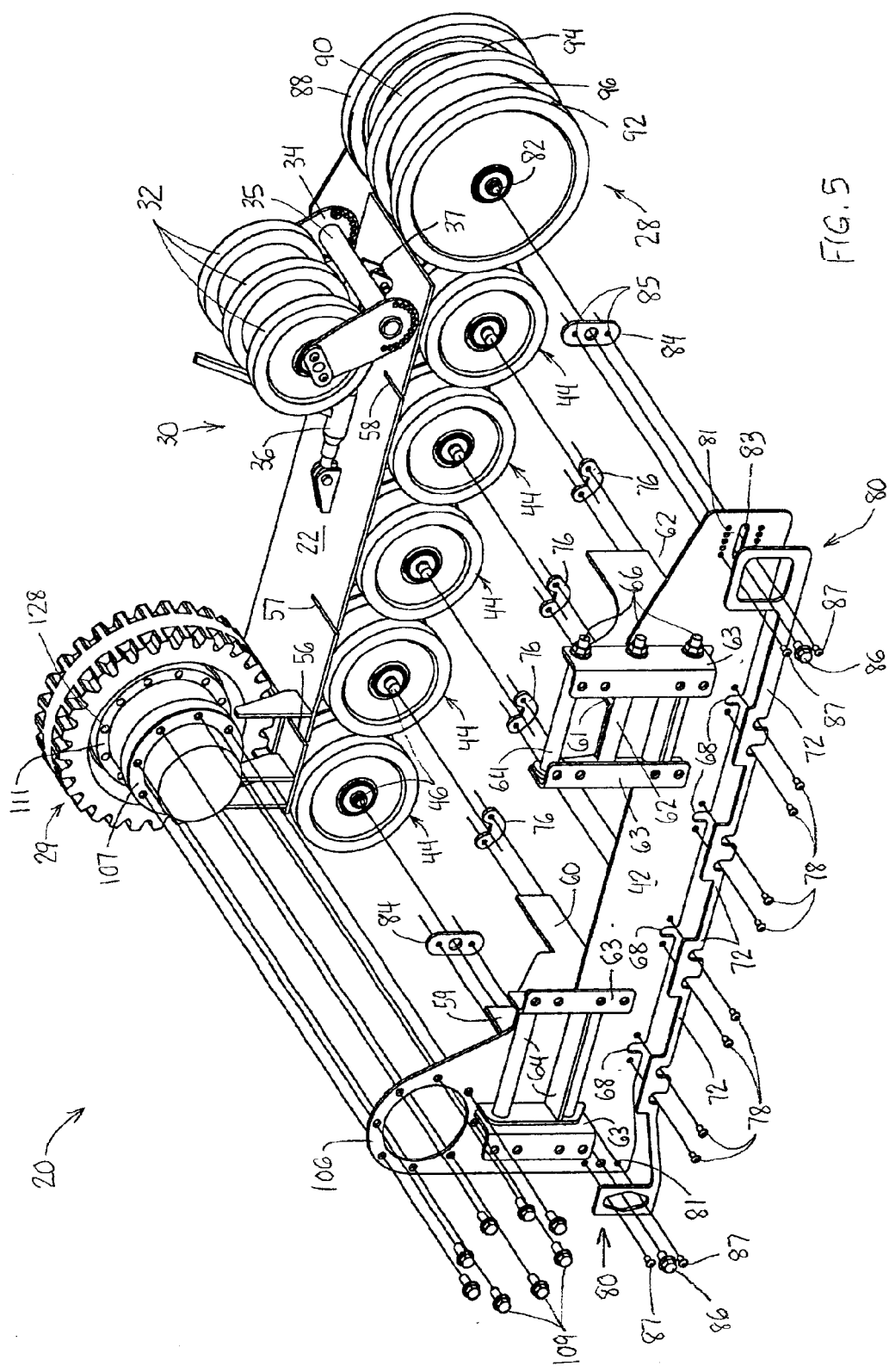
FIG. 5 is an exploded view of portions of the right side of the assembly shown in FIG. 4.
Figure 6:
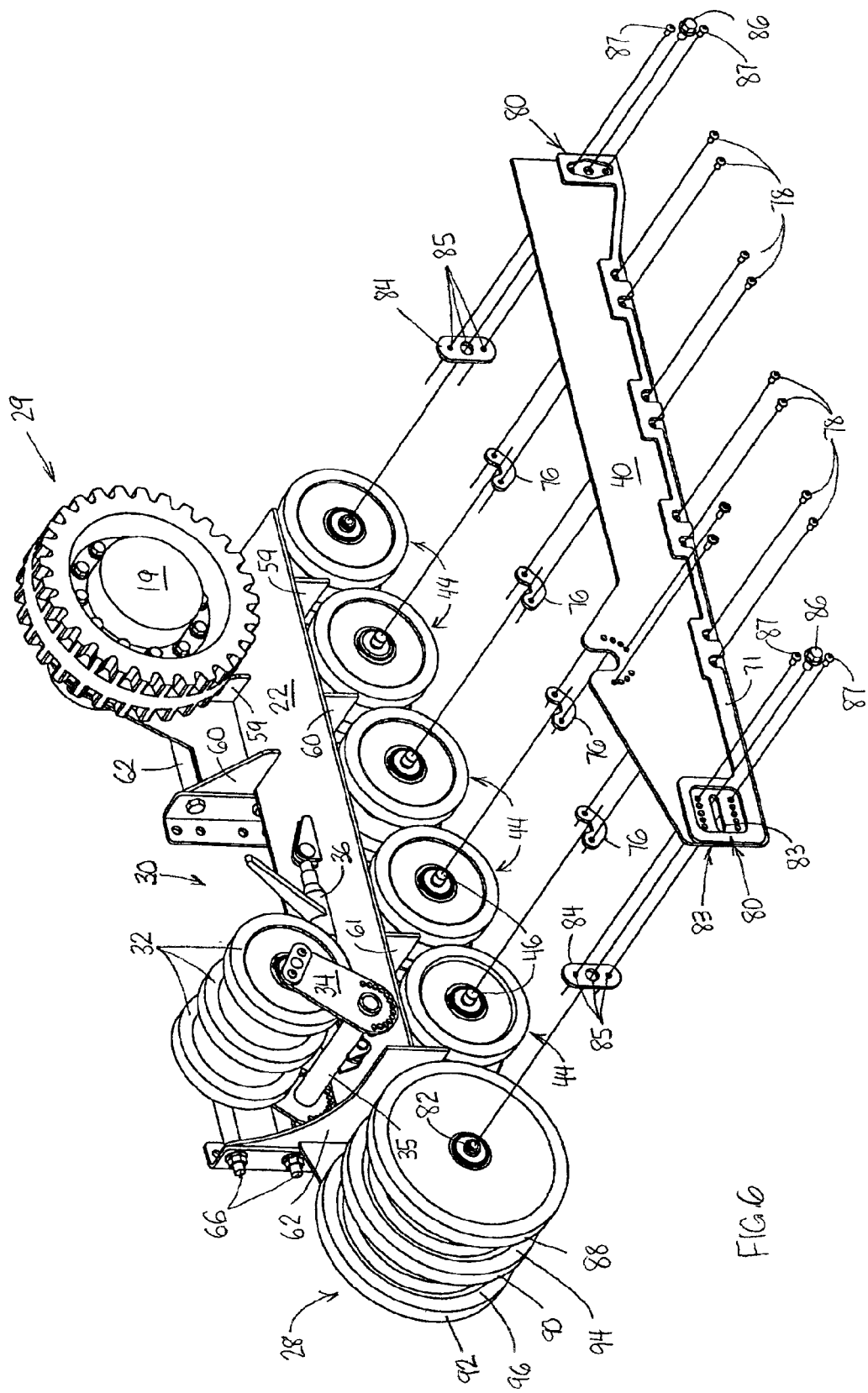
FIG. 6 is an exploded view of portions of the left side of the assembly shown in FIG. 4.

Preferably, and as shown in FIGS. 4–6, the tensioning device 30 includes a plurality of wheels 32 mounted on an axle supported at the free ends of arms 34. The arms 34 are secured to a pivot member 35 supported on the side plates 40,42. A ratcheting member 36 has one end anchored to the top plate 22 and its opposite end connected to a crank arm 37 on the axle 35. To tension the track 18, the ratcheting device 36 may be actuated to move the arms 34 and cause the wheels 32 to bear against the inner surface of the track 18 to keep it taut or tightly held against the idler 28, sprocket and track rollers described below. After the proper tension is obtained, the arms 34 may be locked to the side plates by bolts 33 which pass through mating openings provided in the arms 34 and side plates 40,42.

The frame subassembly 20 is best shown in FIGS. 4–6. Looking specifically to FIG. 5, slots 56, 57 and 58 are formed in the top plate 22 at the edges thereof for accepting gusset members or brackets 59, 60 and 61 welded to and extending from the side plate 42. The brackets 59–61 are inserted into the slots 56–58 and then, preferably, are welded to the beam 22. An additional bracket 62 welded to the plate 42 extends along the forward edge of the top plate 22 and is welded thereto. Preferably, each of the mounting plates 40,42 is welded to the edge of the top plate 22. Also, as will be understood by those skilled in the art, the outer ends of the gussets or brackets 59, 60, 61 and 62 as seen in the FIG. 5 exploded view will also be welded to the opposite side plate 40 shown in FIG. 6.

The brackets or gussets 59, 60, 61 and 62 also extend to the outer side of the side plate 42 where they serve to secure right angle mounting members 63. Spacers 64 are positioned between the brackets 59 and 60 and between the brackets 61 and 62. Bolts 66 extend through and clamp the brackets, right angle mounting members 63 and spacers 64 together. The right angle members 63 serve to secure the completely preassembled track assemblies 16 to the vehicle frame 14 and the spacers 64 add rigidity.

As best shown in each of FIGS. 5 and 6, a plurality of track roller sets 44 are supported upon axles 46 and are disposed beneath the subassembly 20. The ends of the axles 46 are received in semi-circular notches 68 formed in the lower edges of the side plates 40,42. Winged retainers 76 engage in grooves (not shown) formed in the axles 46 and are secured to the lower edges of the side plates 40 and 42 by fasteners 78 to retain the axles 46 in position in the notches 68.

Reinforcing plates 71 and 72, as shown in FIGS. 5–6, are welded to the lower edges of the side plates 40,42 and cover the notches 68. Plates 71 and 72 are also provided with notches which receive the heads of fasteners 78 so they do not project beyond the surface of the plates 40,42 where they may be susceptible to damage. As also shown in FIGS. 4–6, the reinforcing plates 71 and 72 include cutout portions 80 adjacent their ends. The side plates 40,42 are provided with screw receiving openings 81 in the area of the cutout portions for the purpose of mounting the rearmost set of track rollers 44 and the idler 28. The idler 28 is carried on an axle 82 which is of a length slightly less than the distance between the interior surfaces of the side plates 40 and 42. A retaining plate 84 is placed on the end of the axle 82 and is secured to the respective side plate 40 or 42 by screws 87 which extend through the screw receiving openings 81. One of the screw receiving openings in the forward end of the side plates is in the form of a fore and aft oriented slot 83, and a cap screw 86 extends through this slot and into a threaded bore in the end of the shaft 82.

Relocation of the idler 28 on the assembly 16 can be achieved through loosening of the cap screws 86 and removal of the screws 87. The idler 28 can then be slid fore and aft within the limits of the slots 83. If the cap screws 86 are removed, the idler can be removed from the assembly. When the idler 28 is properly positioned, the screws 87 are inserted through appropriate openings 81 and all the screws are tightened to secure the idler 28 in the new position.

The rearmost track roller set is mounted in a similar manner with retaining plates 84 and screws 86 and 87. However, there is no elongated slot 83 provided at the rear of the side plates 40, 42 and thus the rearmost set of rollers 44 is not adjustable.

Looking again at to FIGS. 5 & 6, right mounting plate 42 includes a semi-circular portion 106 that extends above the top plate 22. A circular cutout in the portion 106 receives a portion of the associated hydraulic motor 19. The portion 106 has spaced screw openings that mate with tapped holes in a shoulder 107 associated with each of the motors 19. The motor 19 is secured to the portion 106 of the plate 42 with bolts or fasteners 109 which extend through the openings in portion 106 and are threaded into the tapped holes in the shoulder 107.

Figure 9:
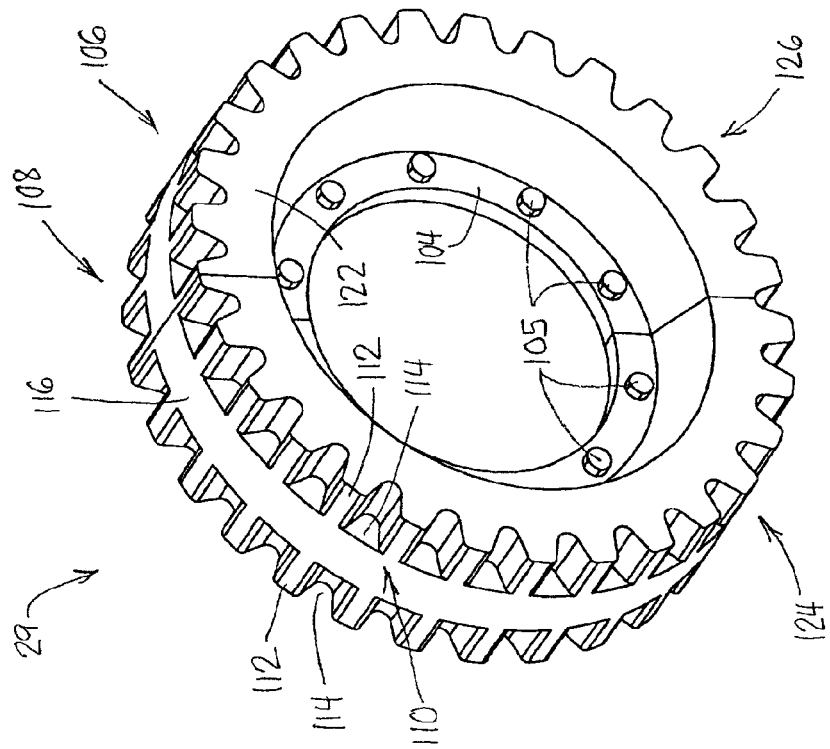
FIG. 9 is a side perspective view of the drive sprocket of the track assembly of FIG. 2.
Figure 10:
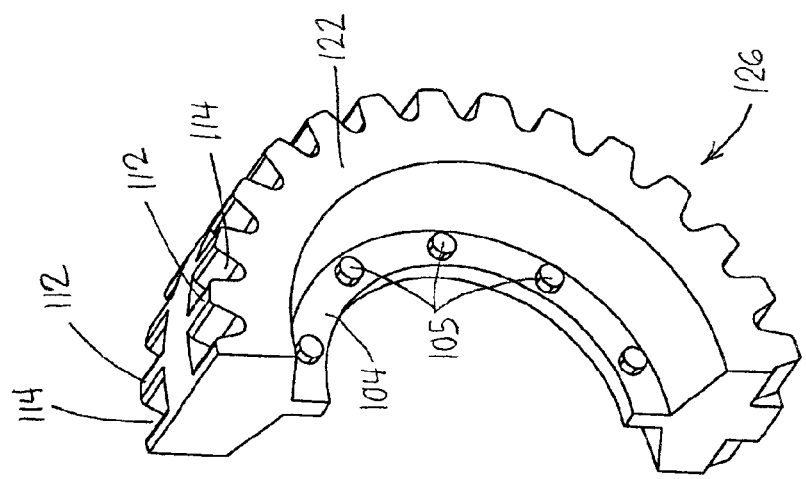
FIG. 10 is a side perspective of a half section of the drive sprocket according to FIG. 9.

The drive sprocket 29 is best shown in FIGS. 9 and 10. The sprocket 29 includes an inner mounting ring 104 and an outer periphery with two annular rows 108,110 of alternating track engaging teeth 112 and associated grooves 114. Each of the rows 108,110 is separated by a smooth ring portion 116. The inner ring 104 is provided with spaced mounting holes which mate with like tapped bores in a shoulder ring 111 (see FIG. 5) on the hydraulic motor 19. Cap screws 105 extend through the openings in the mounting ring 104 and into the tapped bores 128 on the shoulder ring 111 to secure the sprocket 29 to the hydraulic motor 19. The sprocket 29 is made of two equal halves 124 and 126, and one of the halves 126 is shown in FIG. 9. This construction makes it easier to mount the sprocket 29 on the hydraulic motor 19 and removal of half of the sprocket 29 facilitates the mounting and removal of the track on the subassembly.

Figure 3:
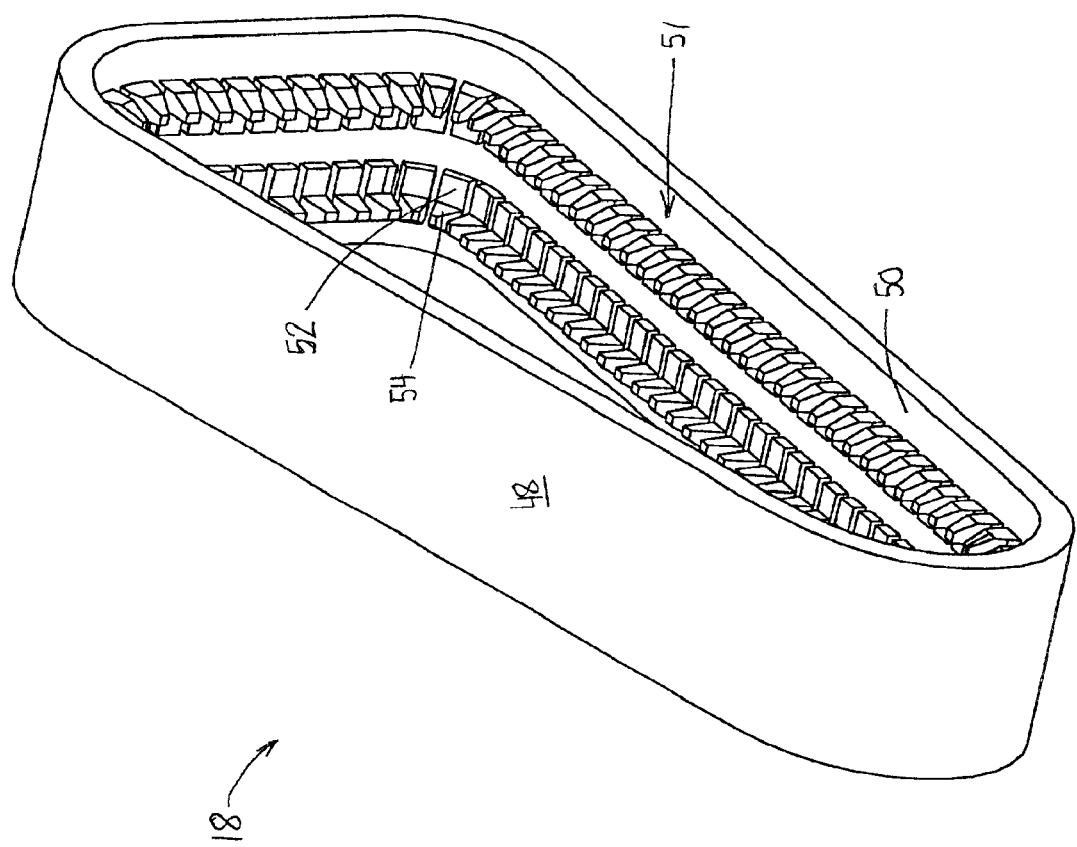
FIG. 3 is a side perspective and elevated view of the track constructed according to the present invention and used in conjunction with the assembly of FIG. 2.
Figure 8:
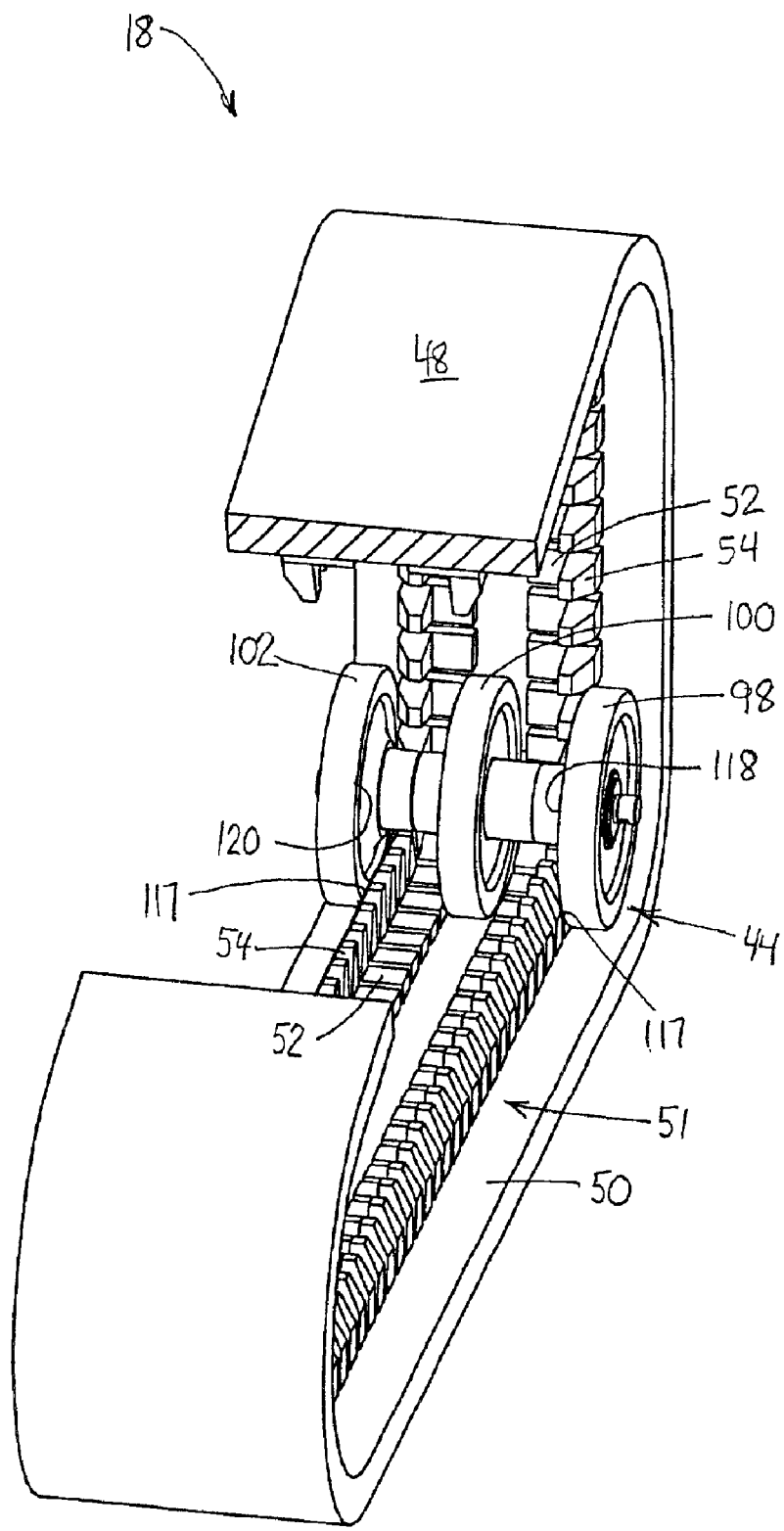
FIG. 8 is a side perspective and elevated view of the track having a top portion removed to show placement of a set of track rollers thereon.

The track 18 is shown most clearly in FIGS. 3 and 8 and it includes an outer surface 48 and an inner surface 50. The outer surface 48 will include a suitable tread (not shown) for engaging the ground. Extending from the inner surface 50 are two spaced rows of raised projections or lugs 51. As shown, the two rows of lugs straddle the centerline of the track 18 between its lateral edges and the lugs are directly opposed to one another. Each of the lugs 51 includes a generally rectangular first or drive portion 52 joined with a substantially taller second or guide portion 54. Together, the drive portion 52 and guide portion 54 form a right angle or L shaped lug.

Figure 7:
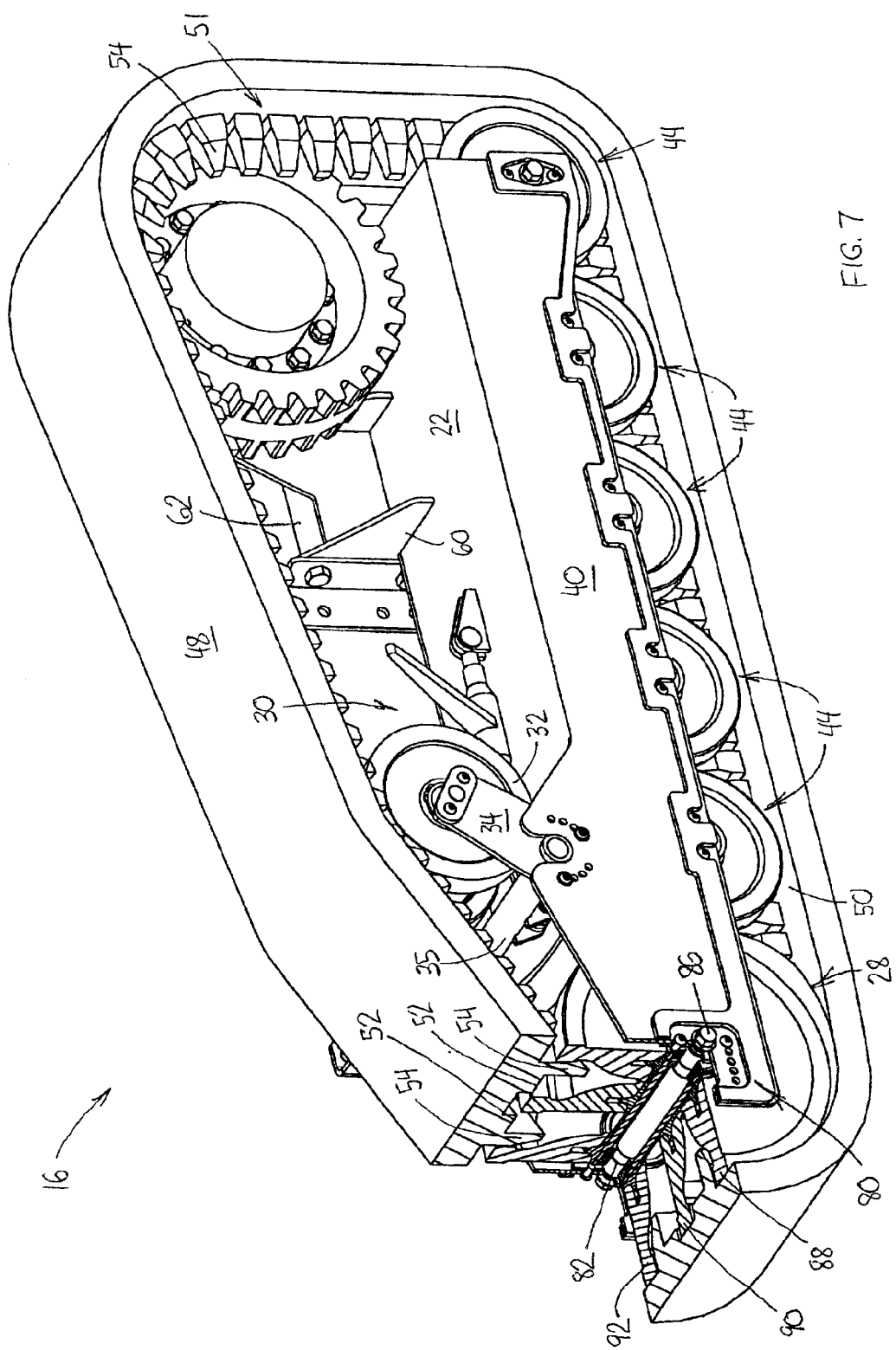
FIG. 7 is a side perspective and elevated sectional view of the track mounted to the frame subassembly and which provides a view of the placement of the idler wheel relative to the track.

FIG. 7 provides a sectional view of the placement of the drive and guide portions 52, 54 of the lugs 51 relative to the idler wheel 28 when the track 18 is installed on the subassembly 20. As shown, the idler 28 consists of left, middle and right discs 88,90,92, respectively, which are mounted on the idler axle 82. The guide portions 54 can be seen to abut an inside surface of each of the left and right discs 92 and 88 to help maintain track alignment. The inner disk 90 runs on the inner surface 50 of the belt between the spaced rows of lugs while the outer disks 88 and 92 run on the inner surface 50 outside of the spaced rows.

In FIG. 8, an exemplary track roller set 44 is shown to have three rollers or discs 98,100,102. Use of three rollers or discs further helps to keep the track 18 aligned between the rollers 44 and the idler 28 since each row of lugs will be restricted between the middle discs 90 and 100 and the respective outer discs 88,92 and 98,102, as shown in FIGS. 7 and 8. As further shown in both FIGS. 7 and 8, the drive portions 52 of the lugs 51 fit in close proximity to the middle discs 90,100 without contacting it so as not to damage the lugs 51 and the ability of the sprocket 29 to engage them.

When track misalignment forces can be the greatest, in the area of the idler and track rollers, the outermost surfaces of the lug guide portions 54 cooperate with the idler 28 and track rollers 44 in retaining alignment of the track 18. As shown in FIG. 8, a bottom outer surface portion 117 of each guide portion 54 substantially abuts against an inside surface 118,120 of a respective track roller 98,102 to resist lateral movement of the track 18.

When coming into contact with the sprocket 29, the inner surface of the guide portions 54 may bear against an outside surface 122 on each side of the drive sprocket 29 to align the track 18 and sprocket 29 as the drive portions 52 move into engagement with the sprocket teeth 112. This is best shown in FIG. 2. As contact occurs on each of the opposite sides 122 of the sprocket, the lug drive portions 52 become seated or retained within the grooves 114 of the sprocket 29 until they are rotated out of engagement therewith.

When removal of the track 18 is desired, an operator may begin by removing a first or second half 124 or 126 of the drive sprocket 18 that is not engaged with the track 18. Thereafter, rotation of one the engaged sprocket halves 124 or 126 180 degrees is necessary. With this rotation, enough slack will be obtained to remove a rear portion of the track 18 from the subassembly 20. Having this slack, an operator can now begin to remove the track 18 from engagement against the front idler 28.

To disengage the track 18 from the idler wheel 28, the retaining plates 84 at the idler wheel 28 need to be released from engagement with the plates 40, 42 by removal of the screws 87 shown in FIGS. 5 and 6. This permits the idler 28 to be moved to its rearmost position or towards the sprocket 29. After this occurs, the track 18 may be subsequently removed from the subassembly 20 by sliding it to one side relative to the beam 22. To install the track 18, the process is reversed.

Thus, there is provided a track having lugs which resist its movement from the sprocket and from between the track rollers and a track subassembly containing such a track which can be completely preassembled before it is secured to a vehicle.

Having described the preferred embodiment, it will become apparent that various modifications can be made without departing from the scope of the invention as defined in the accompanying claims.

We claim:

1. A track assembly for moving a vehicle, the assembly comprising:
   a) a beam having a top plate and first and second side plates depending from the top plate;
   b) a plurality of spaced track rollers mounted to the side plates beneath the top plate;
   c) a drive sprocket having alternating teeth and grooves and being supported on the beam adjacent one end thereof and above the top plate;
   d) an idler wheel supported by the side plates adjacent the end of the beam opposite from the drive sprocket; and
   e) an endless elastomeric track having outer and inner surfaces, the track being entrained about the rollers, the idler and the sprocket with its inner surface engaging the same, the inner surface including two laterally spaced rows of lugs, each of the lugs having first and second portions of different size and shape, the first portion being receivable in the grooves of the sprocket in driving relationship with the teeth, the second portion extending along and being engageable with an outer side surface of the sprocket when the first portion is in driving relationship with the sprocket; the idler wheel having a disc that runs on the inner surface of the endless track between the two laterally spaced rows of lugs.

2. The assembly as recited in claim 1 wherein:
   each of the track rollers include at least a left, middle and right disc, the middle disc engaging the inner surface of the track between the rows of lugs, each of the left and right discs engaging the inner surface of the track adjacent the second portions of the lugs.

3. The assembly as recited in claim 1 wherein:
   the first and second portions of each lug meet and the second portion is taller than the first portion.

4. The assembly as recited in claim 3 wherein:
   the second portions of the lugs substantially brace against a side surface of the sprocket and against inner side surfaces of the left and right discs of the track rollers.

5. The assembly as recited in claim 1 wherein:
   the first and second portions are drive and guide portions, respectively, which meet to form a right angle.

6. The assembly as recited in claim 1 wherein:
   the first and second portions meet to form a right angle and the second portion braces against a side surface of the sprocket as the first portion is engaged by the sprocket teeth.

7. A track assembly for moving a vehicle, the assembly comprising:
   a) a frame subassembly including a fore and aft extending center beam having a top plate, and first and second side plates;
   b) a plurality of spaced track rollers mounted to the side plates below the top plate, the rollers having a plurality of roller discs;
   c) an idler carried on an axle supported by the first and second side plates with at least a portion of the idler positioned beyond the first end of the beam;
   d) a dual-component drive sprocket including alternating teeth and grooves, the sprocket being rotatably carried by one of the first and second plates above the center beam;
   e) an endless elastomeric track having an outer surface, and an inner surface which engages the idler, the track rollers and the sprocket as the track moves the vehicle, the inner surface including two rows of lugs, each row of lugs positioned laterally between two of the roller discs, the lugs having first and second portions, the first portion being drivingly engaged by the sprocket to cause movement of the track as the second portion braces against the sprocket to assist in maintaining contact between the sprocket and inner surface; and
   f) each of the first and second side plates including apertured portions for accommodating their respective connection with each of the idler and at least one of the track rollers.

8. The assembly as recited in claim 7 wherein:
   the drive sprocket consists of first and second detachable halves.

9. The assembly as recited in claim 8 wherein:
   removal of the track relative to the sprocket is permitted by removal of one of the halves of the sprocket and subsequent rotation of the remaining half.

10. A track assembly for moving a vehicle, the assembly comprising:
    a frame subassembly including a center beam having a top plate, and first and second side plates, the subassembly further comprising;
    a plurality of spaced track rollers disposed below the beam;

an idler wheel carried on an axle supported at the first and second side plates, the wheel positioned beyond the first end of the beam;

mounting apparatuses associated with each of the first and second side plates, the apparatuses including apertured sections for accommodating their respective connection with each of the idler and at least one of the track rollers, the apparatuses further including fasteners and associated retaining plates, the fasteners being disposed in removable engagement with the apertured sections and retaining plates for joining the first and second side plates with the idler and at least one of the rollers;

a split drive sprocket having first and second halves, the sprocket being carried by one of the first and second side plates;

an endless elastomeric track having an outer surface and an inner surface which engages the idler, the track rollers and the sprocket when the track moves the vehicle across the ground, the inner surface including two rows of lugs which are moveable between the spaces defined by the rollers, each of the lugs including first and second portions, the first portion being engageable with the sprocket to cause movement of the track and the second portion being taller than and forming a right angle with the first portion so as to grasp against a side surface of the sprocket and substantially brace against the track rollers to maintain alignment of the track with the sprocket and between the rollers;

a tensioning device to adjust engagement of the track against the idler and the sprocket, the fastening members being removable, the track being removable from engagement with the idler, track rollers and sprocket upon removal of a portion of the sprocket, removal of the fastening members adjacent the idler and movement of the idler to a substantially rearward upright position; and mounting members associated with one of the first and second side plates for permitting attachment of the track assembly to the vehicle as a pre-assembled unit.

11. An endless track for a track laying vehicle, the track including an elastomeric body having an outer ground engaging surface and an inner surface, the inner surface including a pair of spaced rows of lugs, the pair of rows straddling a center line between the edges of the track, each of the lugs having a driving portion and a guiding portion, both portions extending from the inner surface of the elastomeric body, the driving portion of each lug being inboard of the guiding portion, and the guiding portion of each lug having a dimension substantially perpendicular to the inner surface of the track and greater than the same dimension of the driving portion of the lug.

12. An endless track as set forth in claim 11 wherein the lugs of the spaced rows are of an L-shape and are directly opposed to one another.

* * * * *